Aug. 24, 1965          J. W. DODSWORTH          3,202,091
                  LISTER CONTROLLED CHECK PRINTER
Filed June 24, 1963                              6 Sheets-Sheet 5
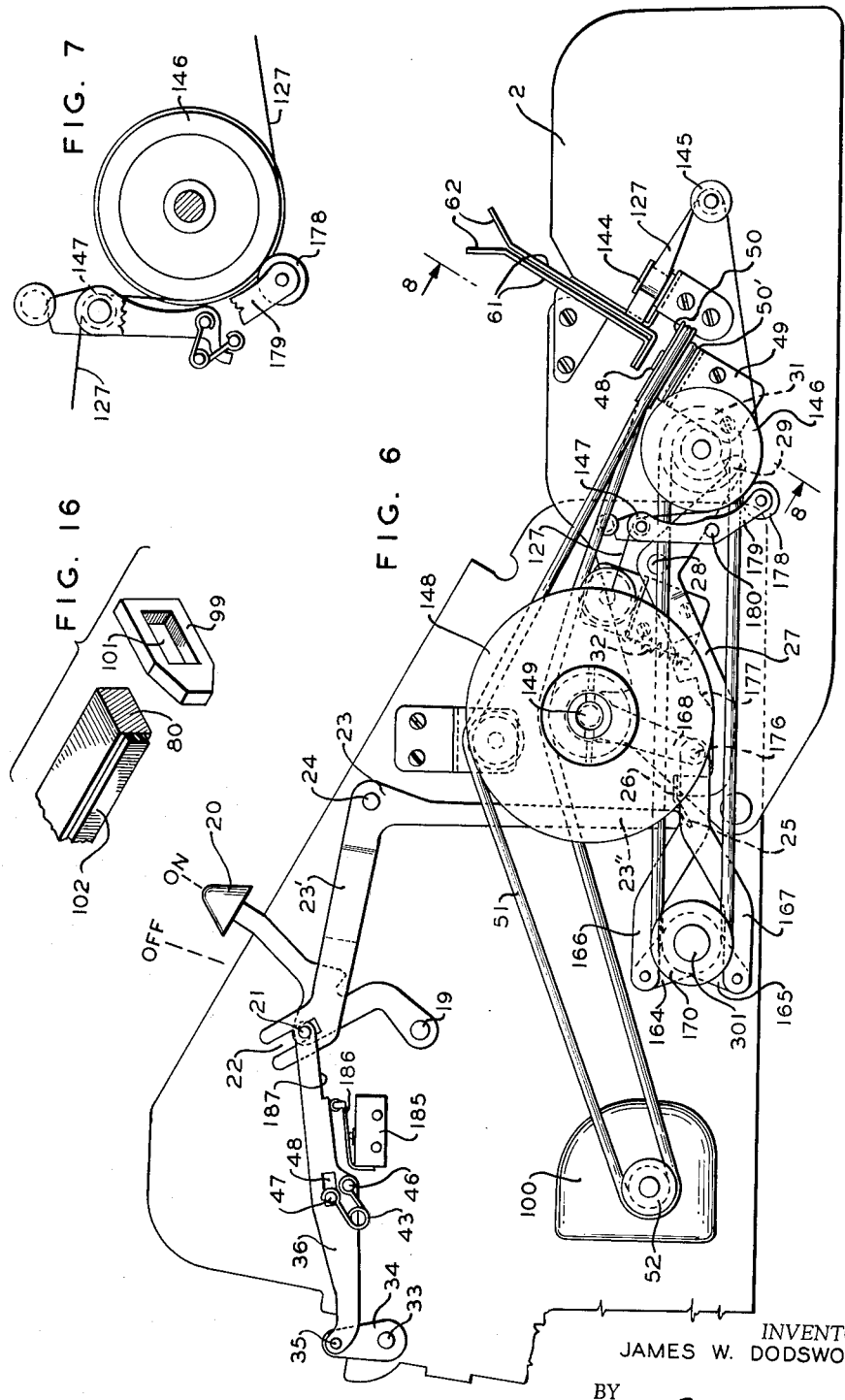
INVENTOR.
JAMES W. DODSWORTH
BY
Elmer M Edwards
AGENT

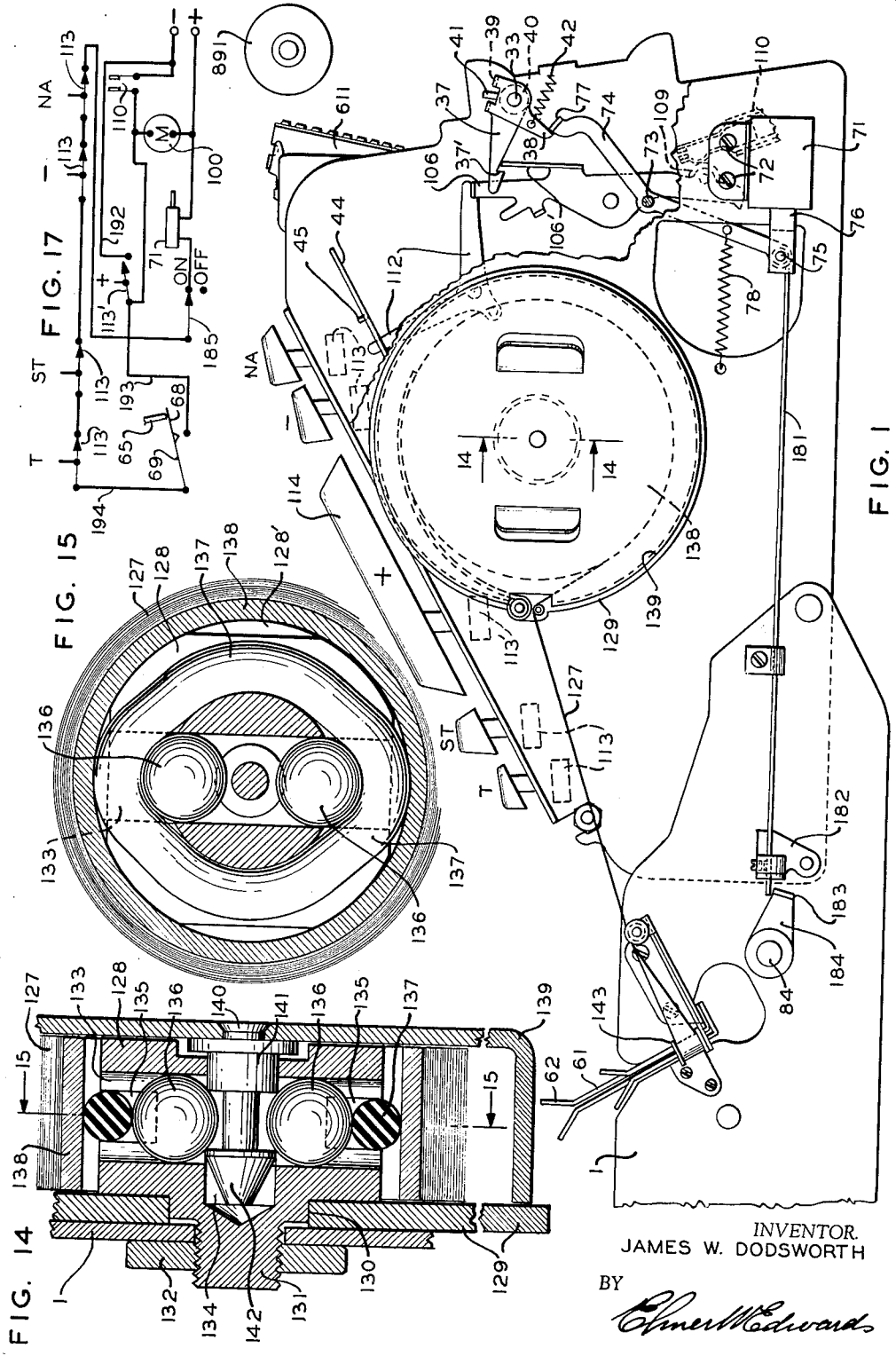
Aug. 24, 1965　　J. W. DODSWORTH　　3,202,091
LISTER CONTROLLED CHECK PRINTER
Filed June 24, 1963　　6 Sheets-Sheet 1
INVENTOR.
JAMES W. DODSWORTH
BY
Elmer W. Edwards
AGENT

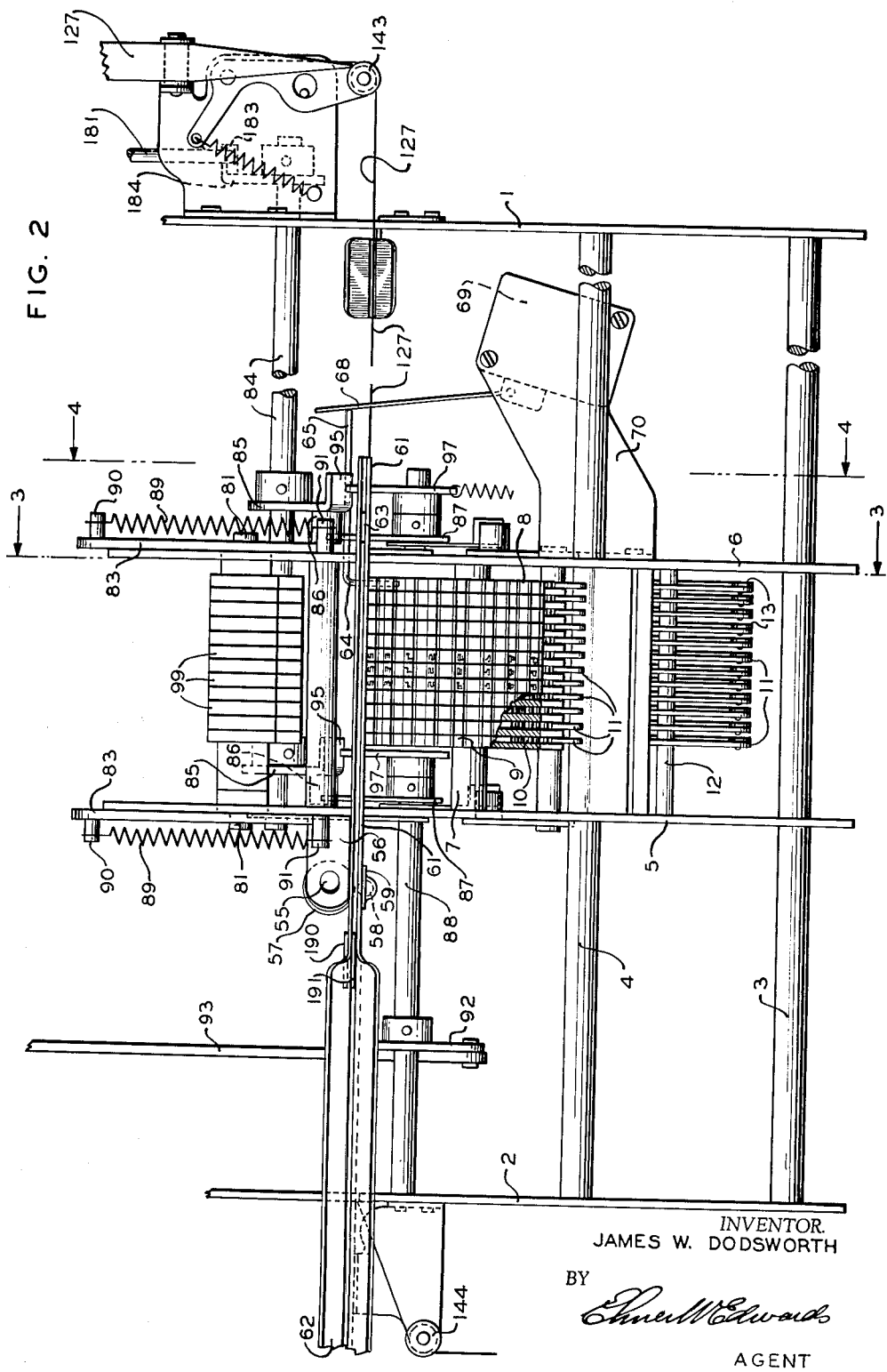

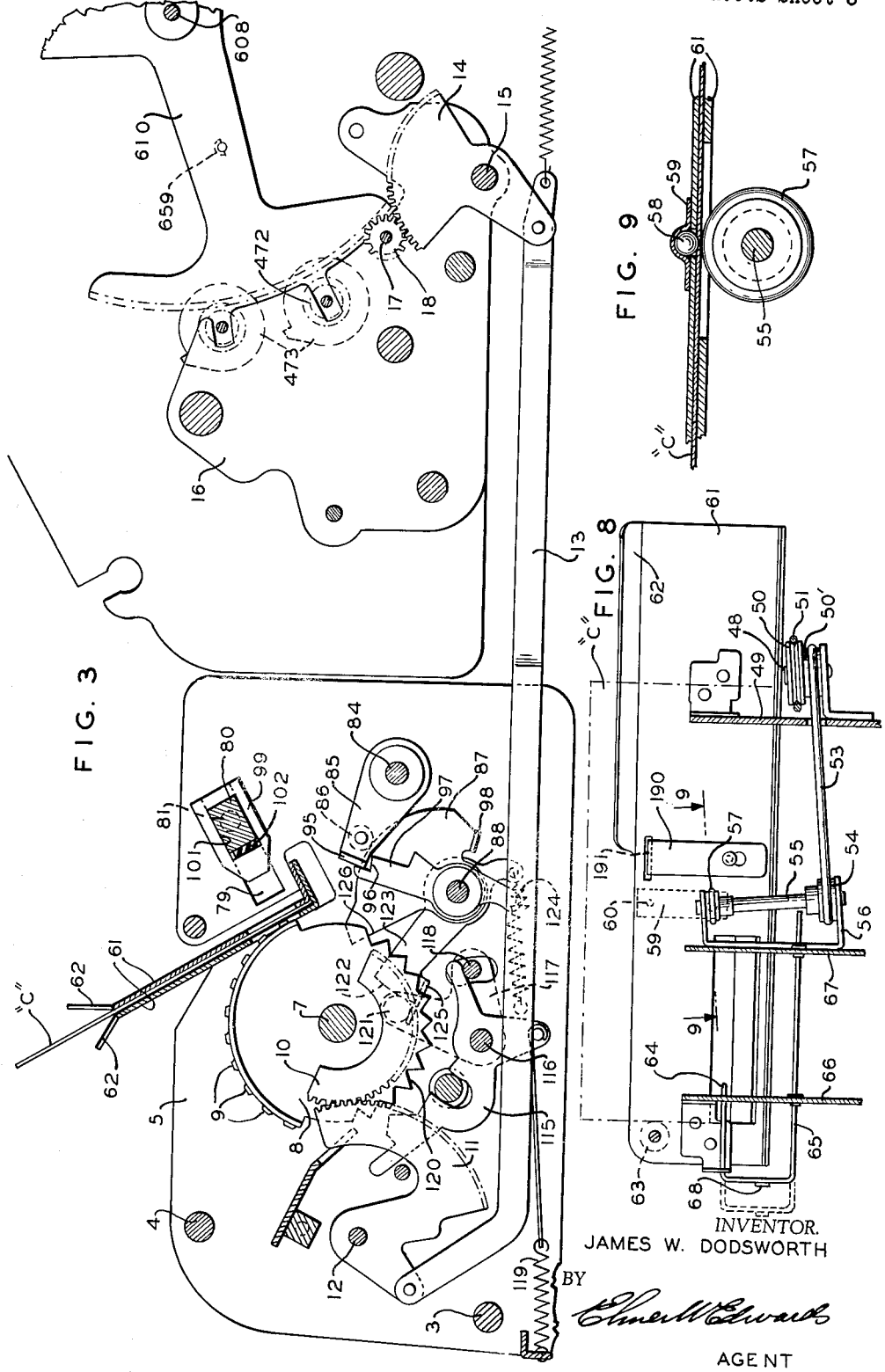

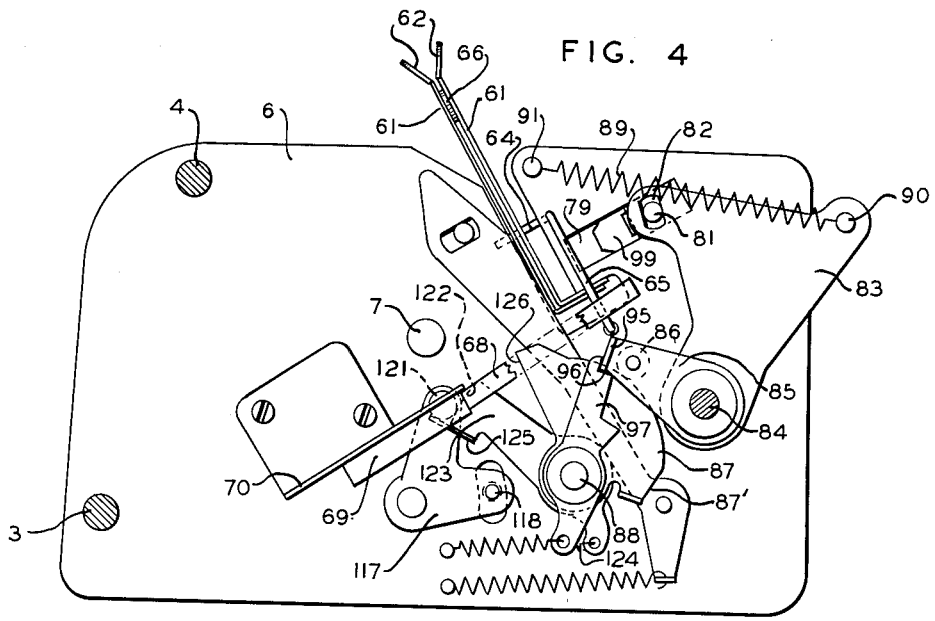

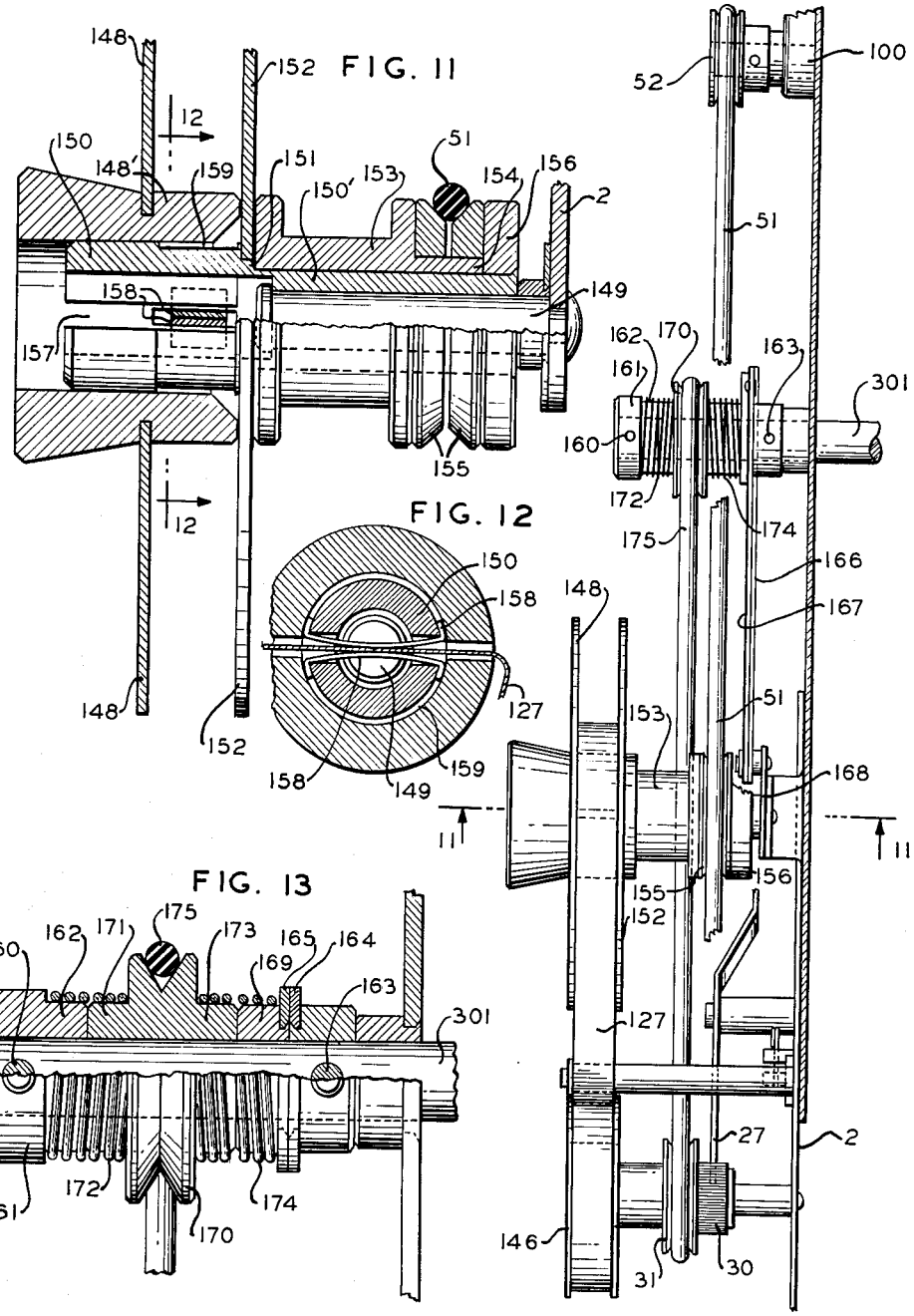

United States Patent Office 3,202,091
Patented Aug. 24, 1965.

3,202,091
LISTER CONTROLLED CHECK PRINTER
James W. Dodsworth, Mount Tabor, N.J., assignor to Monroe International Corporation, a corporation of Delaware
Filed June 24, 1963, Ser. No. 290,046
27 Claims. (Cl. 101—90)

This invention pertains to an auxiliary printing means and more particularly to a bank check printer as applied to a motor operated lister-adding machine, of the type disclosed in United States Patent No. 2,330,270 issued September 28, 1943, to Loring P. Crosman and entitled, Register, wherein amounts set up on the keyboard thereof are caused to be entered upon suitable registers, while being printed upon a record strip through means of the usual type bar members.

In order to provide for a proof total to which subsequent positing operations may be compared for the purpose of checking the accuracy of a posting operation, it is customary in banking operations for an operator to prelist any batch of checks and also the subsequent total thereof upon a tally tape roll. Following such prelisting, today's advance in data processing equipment permits checks to the individual accounts to now be posted thereto in an automatic manner.

An object of the present invention therefore is to facilitate such automatic posting operations by providing for auxiliary printing devices whereby certain pertinent information, such as the amount appearing upon the face of each individual check, will be reprinted in paramagnetic ink characters at an appropriate place upon the check, concurrently with such prelisting operations. Thereafter each check is fed through an automatic reading mechanism, which in known fashion is adapted to sense the magnetically printed characters and translate them into suitable signals which may be readily handled by such automatic processing equipment to effect said posting operations. Thereafter by cross checking with the prelist total an operator is thus able to determine whether error has occurred during the posting operations.

As a further object the invention provides for check feeding devices in direct train with a motor having clutch means in train therewith for the lister/adder devices; and including control means for effecting selective operations of said clutch according to lister/adding machine operations only or in combination therewith a check printing operation.

Another object of the invention is the provision of control means operable to start the motor and to release said clutch for operating the lister/adder devices or alternatively for starting motor operation to effect a check feed operation only and to subsequently release said clutch under control of the check feed operation.

Another object of the invention provides for manual control means uniformly operable for starting the motor and for releasing said clutch control means and including control devices for modifying said clutch release whereby to prevent operation of the lister/added devices until an amount check is brought to the auxiliary printing position.

Another object is the provision of means under control of an amount check in said auxiliary printing position for effecting a release of the cyclic clutch to cause an operation of the lister-adder.

These and other objects and features of the present invention will appear from the following description thereof wherein reference is made to the accompanying drawings which illustrate a preferred embodiment of the invention but without intending to limit the invention thereto.

In the drawings:
FIG. 1 is a right side elevation of a lister-added including the check printer attachment of the present invention.
FIG. 2 is a plan view of the check printer attachment shown in FIG. 1.
FIG. 3 is a right vertical section through the register actuator portion of the machine of FIG. 1; and of the check printer means as taken on line 3—3 of FIG. 2.
FIG. 4 is a right vertical section of the check printer taken on line 4—4 of FIG. 2.
FIG. 5 is a detail elevation of the cyclic clutch means for the lister-adder machine.
FIG. 6 is a left side elevation of the combined lister-adder and check printer.
FIG. 7 is a detail view of the drive pulley for the magnetic ink ribbon.
FIG. 8 is a rear elevation of the check feed devices, as viewed along line 8—8 of FIG. 6.
FIG. 9 is an enlarged detail plan view of the check feed roller shown in FIG. 8.
FIG. 10 is a detail plan view of the printing ribbon feed devices shown in FIG. 6.
FIG. 11 is an enlarged cross section taken on line 11—11 of FIG. 10.
FIG. 12 is a sectional view along line 12—12 of FIG. 11.
FIG. 13 is an enlarged detail view of an oscillator drive means for the printing ribbon feed devices.
FIG. 14 is an enlarged cross sectional view of a support reel for the printing ribbon, as viewed along line 14—14 of FIG. 1.
FIG. 15 is a cross sectional view of said reel as viewed along the line 15—15 of FIG. 14.
FIG. 16 is a detail perspective of one of the check printing hammers.
FIG. 17 is a wiring diagram of the control circuit.

As fully set forth in the above reference patent, motor operation for the lister-adder is initiated by imparting a rocking movement to a clutch control lever 106 (FIGS. 1, 5) said lever being provided with an insulation roller 109 operable to close the contacts of a switch 110 interposed in the circuit of an electric motor 100 (FIG. 17). Rocking movement of lever 106 (FIG. 5) will also move the bottom end of said lever out of contact with a spring actuated pawl 103, mounted upon a plate 105 and forming the driven member of a clutch. Upon release, pawl 103 will be moved into contact with the driving member 104 of the clutch, having direct driving connection with the motor 100.

Plate 105 is connected by link 108 with an arm 316 fast upon a rock shaft 301, a cam 318 being also fixed upon said shaft and serving to impart reciprocatory motion to a frame 616, mounted upon a transverse shaft 603. Three armed differential actuator levers 610 (see also FIG. 3) are loosely mounted upon shaft 603 and are normally coupled to frame 616 by means of a series of spring pawls 617 mounted on a rod of the frame and engaging studs 659 of levers 610. The forward arm of each differential actuator lever 610 is provided with segmental rack teeth, adapted to mesh with the pinions 472 of a series of accumulator wheels 473. Index bars 615 are pivotally connected with the upper arms of levers 610, these index bars being moved, upon counterclockwise rotation of the levers, into engagement with the stems of selectively depressed keys of the usual value setting keyboard. Type bars 611 (FIG. 1) are pivotally connected to the rearward arms of levers 610, each type bar being provided with a longitudinally disposed series of type representing the digits 0 and 1 to 9.

Registration and printing of amounts set up on the value keys is effected by the depression of a motor key 114 (FIG. 1) which upon depression serves to effect release of a spring charged slide 44. Upon release slide 44 moves forwardly and a lug 45 thereof will engage with the upper arm of a pivoted latch 112, thereby releasing said latch from the clutch control lever 106. Upon release clutch lever 106 is moved counterclockwise by its spring 111 (FIG. 5) and insulation roller 109 on said lever thereupon acts to close the contacts of switch member 110 in the circuit for starting the electric motor 100. Subsequent to the start of motor 100 the lower end of lever 106 continuing in its movement will disengage from the tail of clutch pawl 103, whereby to effect a regular cyclic operation of the above lister-adder devices, as in the well-known manner.

Check printer unit

To facilitate the updating of individual accounts by automatic processing machines many banks issue check books today having a subscriber's particular account number (in the form of magnetic ink) printed upon each individual check. However, since at the time a check book is issued the particular amount of any check is indeterminate it is necessary to provide some means by which an operator may subsequently copy any face values from the checks and to print such values by means of magnetic ink upon a given portion of the check so as to be subject to sensing by the control machine. Check printing machines are well known whereby to effect magnetic ink printing operations. However, for this purpose the present invention provides for a check printer operable under the control of a lister-adder machine while in process of effecting the prelisting of a batch of checks, so that both such prelisting and check printing operations are now effected concurrently with each machine cycle of operation. As shown in FIGS. 1 and 6, the check printing unit of the present invention includes right and left side frames 1 and 2, said frames extending forwardly to, in effect, form a continuation of the main side framing of the adder-lister machine. Mounted intermediate of frames 1 and 2 (FIG. 2), upon suitable support rods 3, 4 secured therein, are left and right subframes 5, 6. Rotatably mounted upon a shaft 7 (FIGS. 2, 3) bearinged within said frames 5, 6 is a series of printing wheels 8. A segmental portion of the peripheral diameter of each wheel includes a series of type elements 9 corresponding to the digit values 0 and 1 to 9, as for the type members 611 (FIG. 1). To the right side face of each printing wheel 8 is secured a gear segment 10 having engagement with the teeth of a related gear segment 11 pivoted upon a support shaft 12 mounted within the left and right subframes 5, 6 of the check printer unit. Said gear segments 11 are connected, by means of related links 13, each to the lower end of a corresponding gear segment 14 pivoted upon a transverse shaft 15, mounted within the left and right subframes 16, which support the register means 473.

Also supported within said left and right subframing 16 is a shaft 17 upon which is loosely mounted a series of wide toothed pinions 18. Each of the pinions 18 are in permanent mesh for connecting a corresponding order actuator 610 with a related one of the gear segments 14. Thus during an operation of the lister-adder a value displacement of any actuator 610 in accordance with amounts set up on the keyboard is now caused to also, through means of the related segments 14, links 13, and segments 11, 10, effect a corresponding value displacement to each of the related orders of printing wheels 8.

As well known, in machines of the lister-adder type and being more fully set forth in U.S. Patent No. 2,307,669 issued January 5, 1943 to Loring P. Crosman the printing type bars 611 are fired for engagement with the paper platen 891 near the end of the forward stroke of the parts incident to the value displacement of said type bars 611, after which in a return stroke during the machine cycle the type bars and associated parts are returned to their normal position. The above being the normal operation of the machine for the usual register and printing operations.

When it is desired to effect a check printing operation in association with such register/printing operations special means are provided in the present invention for conditioning the machine for a check printing operation, as will now be described with particular reference to FIGS. 1 and 6.

Pivotally mounted at 19 upon the left side framing of the machine proper is a manually settable two-position lever 20. Said lever has fast therein a leftwardly extending pin 21 having engagement with an open end slot 22 of a rearwardly extending arm 23' of a bell crank lever 23. Bell crank 23 is pivotally mounted to the side framing at 24 and the other arm 23" of said bell crank extends downwardly to a position for cooperation with a cam member 25 formed by a laterally extending projection 26 on the rearward arm of a detent pawl 27 pivoted to the framing at 28.

When it is desired to use the machine in regular listing operations only, such as earlier described, lever 20 will be in an "OFF" or rearward set position to that shown in FIG. 6, so that pin 21 engaging slot 22 holds bell crank lever 23 in a counterclockwise position, whereby arm 23" thereof engages lug 26 for holding detent pawl 27 in a counterclockwise position. In such counterclockwise position a tooth 29 on the forward end of said detent is thus held in engagement with a knurled hub 30 (FIG. 10), to secure a drive pulley 31 against operation, said pulley being fast with hub 30 and associated with the paramagnetic ink ribbon feed devices, hereinafter to be described.

For check printing operations, however, lever 20 is first moved to a forward or "ON" set position, shown in FIG. 6, during which pin 21 rocks bell crank lever 23 clockwise for releasing said lever rearwardly of projection 26 of the detent pawl 27. Upon such release detent 27 is rocked clockwise, under influence of a suitable spring 32, and will release tooth 29 thereof from the above-described knurled hub 30 (FIG. 10).

It will be recalled that normally cyclic operation of the lister-adder machine is initiated, upon depression of a motor key such as the key 114 (FIG. 1), by releasing the clutch lever 106 for a counterclockwise operation. Said lever thereupon acts to engage the contacts 110 (FIG. 5) of a motor switch 109 while also releasing operating pawl 103 to cause operation of the machine cycle clutch.

The above adjustment of manual control lever 20 (FIG. 6) from "OFF" to "ON" check printing position is also adapted, in the manner hereinafter described, to prevent such release of control lever 106 in the operation of said motor key 114.

Pivoted within the left and right side frames and extending transversely of the machine is a shaft 33 (FIG. 6) having fast upon the left end thereof an upwardly extending crank arm 34 to which is pivotally supported at 35 the rearward end of a link 36 having pivoted connection at the forward end thereof with the pin 21 in manual control lever 20. Near the right-hand end of shaft 33 there is loosely mounted thereon a latch pawl member 37 (FIG. 1) which includes a downwardly extending arm 38 offset therefrom by a bifurcated bridge connection 39.

Intermediate of pawl 37 and offset arm 38 there is fast upon shaft 33 a collar 40 having a pin 41 therein extending upwardly between the said bifurcated bridge connection 39 of latch pawl 37. When control lever 20 (FIG. 6) is in its rearward or noncheck printing position shaft 33 is held in a clockwise position to that illustrated in FIG. 1 and pin 41 serves to hold latch pawl 37 in a raised position out of engagement with a projection 106' formed integral with the clutch lever 106. Upon a displacement of manual control lever 20 to forward or check printing position, however, link 36 is moved forwardly therewith, rocking shaft 33 clockwise as viewed in FIG. 6, being counterclockwise as viewed in FIG. 1. In said movement of shaft 33 pin 41 releases pawl 37 for clockwise rotation, under influence of a suitable spring 42, whereby the latch surface 37' is now in the path of movement of the projection 106' of clutch control lever 106. A suitable toggle spring means 43 (FIG. 6) having one end in engagement with a stud 46 fast within link 36 and the other end secured to a stud 47 fixed within the framing and extending through a suitable slot 48 of link 36 serves to hold the parts in their alternative positions described above.

Thus with the manual control lever 20 set in forward or check printing condition a release of lever 106, in response to a motor key 114 operation, will now cause said lever to rock clockwise only a partial movement until stopped by engagement of projection 106' with the latch pawl 37 and thereby disables the usual motor and clutch control operations of said lever. As shown in FIG. 1 and in the wiring diagram (FIG. 17), each of the operation control keys for total, subtotal, subtract and nonadd is provided with a related microswitch 113 all normally closed and connected in single series circuit with a solenoid 71, for the purpose hereinafter to be described. The switch 113' related to plus motor key 114, however, is normally open and upon a depression of said key switch 113' is closed thereby to extend negative circuit from the lead for causing a motor operation.

Check feeding means

As shown in FIGS. 6 and 8, mounted for rotation upon a stud shaft 48, supported upon bracket 49 fast to the machine frame 2, is a pulley wheel 50, including integral therewith a second pulley 50', for rotation on shaft 48. Pulley wheel 50 has drive belt connection 51 with a pulley wheel 52 fast on the shaft for electric motor 100. The pulley wheel 50', as best seen in FIG. 8, has belt connection 53 for operating a pulley wheel 54 fast to the lower end of a shaft 55 supported for rotation within a suitable bracket member 56. Shaft 55 is canted slightly leftwardly as viewed in FIG. 8 and has secured to the upper end thereof for rotation therewith a friction roller 57. Roller 57 has engagement with a ball shaped member 58 (FIG. 9) mounted in a spring tempered support plate 59 secured at 60 upon one of an adjacent pair of guide plates 61 having flanged upper edge 62 (see also FIG. 2) for receiving an amount check "C" as entered for printing.

As above set forth, in the contemplated mode of operation amounts as copied from the checks are first entered upon the digit keys and thereafter a motor bar 114 is operated to start the motor. Thus, through means of the above drive belt devices the motor will immediately cause rotation of the friction roller 57. After such motor starting operation the individual check is now inserted downwardly between the flanged opening 62 of guide plates 61 and thereafter moved laterally into engagement with the rotating friction feed means 57, 58. Upon engagement with said feed means a check is caused to be fed thereby, leftwardly as viewed in FIG. 8 or rightwardly as viewed in FIG. 2 into printing position relative to the check printing hammers 99 hereinafter to be more fully described. During such operation roller 57, due to the canted support shaft 55 thereof will act also to urge the check downwardly into horizontal alignment with the bottom of the chute formed by guide plate 61. To assure that a check is properly inserted laterally forward of feed rollers 57, 58 a spring tempered plate 190 with an offset cam face projection 191 extending across the guide chute 61 is provided as shown in FIGS. 2 and 8.

As a check is brought to printing position the leading edge thereof engages one end 64 of a U-shaped frame 65 (FIG. 8), mounted for slidable movement in brackets 66, 67 of guide plate 61. Engagement of a check with frame 65 will cause said frame to be displaced therewith until the check is subsequently stopped upon engaging the stud 63 fixed in bracket 66. As shown in FIG. 2 frame 65 is in engagement with an upwardly extending arm 68 and during the above operation said frame will impart a clockwise operation to arm 68. Arm 68 comprises the operating member of a normally open microswitch 69, fast to a bracket 70 on the machine subframe 6.

Microswitch 69 over lead 193 (FIG. 17) is in series circuit with the switch 113' for plus bar 114 and also by lead 194 and the series of switches 113 with an electro solenoid 71 (FIG. 1), fast by means of screws 72, to the right side framing of the machine. Pivotally mounted at 73 to the machine frame is a lever 74 the lower arm of which has pivoted connections 75 with the plunger 76 of solenoid 71. The upper arm of lever 74 is provided with a lug 77 adapted for engagement with the arm 38 of the latch member 37 earlier described. Suitable spring means 78 serves to hold lever 74 normally in its clockwise position, illustrated in FIG. 1.

Clockwise operation of arm 68 at the conclusion of a check feed operation, above described, will act to engage the contacts of microswitch 69 for extending negative circuit over lead 192, closed contact 113', lead 193, closed switch 69, lead 194, the series of normally closed switches 113, a lead 195 and a closed on/off master switch 185 for thereby energizing solenoid 71. Upon energizing of said solenoid plunger 76 is moved rearwardly and will rock lever 74 counterclockwise, and lug 77 engaging arm 38 now rocks latch pawl 37 upwardly to lift the hook end 37' thereof free of projection 106' of clutch control lever 106. Thus said lever is now permitted to complete its counterclockwise operation for releasing clutch pawl 103 to start the machine cyclic operation previously held from responding to the earlier operation of motor bar 114, as hereinbefore described. During the said machine cycle of operation the regular type bars are released for listing the amount entry set up on the keyboard, in the well-known manner. At the same time, the following novel check printing devices are now caused to be operated for printing such keyboard entry amounts upon the inserted check.

Within each of the left and right subframes 5, 6 (FIGS. 3, 4) there is provided an elongated slot 79. Extending transversely of the type wheels 8 and being supported at each end for slidable movement within the said slots 79 is a bar 80 provided with trunnion pins 81 for engaging the slotted openings 82 of a pair of similar operating levers 83 (FIGS. 2, 4) fast each to a common operating shaft 84 bearinged within the said subframes 5, 6. Also fast upon shaft 84 is a pair of forwardly extending arms 85 each having a roller 86 engaging a corresponding pair of cam members 87 fast upon a transverse shaft 88 pivotally mounted within subframes 6, 7. Cam members 87 in engaging rollers 86 normally hold shaft 84 and levers 83 in clockwise position against the tension of respective springs 89, secured at one end to a pin 90 in the related lever 83 and at the opposite end thereof to suitable fixed studs 91 in the respective subframes 5, 6.

Fast upon shaft 88 is a crank arm 92 (FIG. 2) having link connection 93 with a crank arm 94 (FIG. 5) fast upon the rock shaft 301 reciprocated during an operation of the cyclic clutch means 103, 104, as earlier described.

It will be recalled that during the forward or counter-clockwise operation of rock shaft 301 the actuator levers 610 (FIG. 3) act to adjust the type wheels 8 of the auxiliary printing means for bringing printing type 9 thereon to printing line position in accordance with the amounts entered upon the digit keyboard of the machine. During said movement of rock shaft 301 crank arm 94 through link 93 and crank arm 92 (FIG. 2) will rock shaft 88 in a counterclockwise direction, as viewed in FIGS. 3 and 4. In said movement of shaft 88 the cams 87 thereon are rocked counterclockwise therewith to fall away from their respective rollers 86. Arms 85 supporting rollers 86 include on the free end thereof a lateral projection 95 engageable with the surface 96 of a latch pawl 97 loosely mounted upon the shaft 83, whereby arms 85 and consequently shaft 84 is latched against a counterclockwise operation during such fall away movement of cam 87, said movement coinciding in the machine cycle with the displacement of type wheel 8 by the actuators 610. After the completion of a value adjustment of type wheels 8 by the actuators 610 a lug 98 on the cam 87 will contact and displace latch pawl 97 free of projection 95 thus releasing arm 85 and shaft 84 for counterclockwise operation along with spring charged levers 83 for the printing bar 80 earlier described.

As shown in FIGS. 2 and 16, corresponding to each order of the printing wheels 8 there is supported upon the printing bar 80 a series of individual hammers 99 arranged in laminal manner. Said hammers each comprise a flat stock slug provided with an opening 101 therein of just sufficient width to permit the mounting of each hammer for a slidable movement upon bar 80. The length of opening 101 however is somewhat longer to the corresponding side length of the bar 80, whereby to permit the entry between bar 80 and the forward surface of each opening of a continuous length of resilient material, such as the leather thong 102 shown.

From the above it will be obvious that upon release of latch 97 from projection 95 levers 83 being thus free for counterclockwise operation by springs 89 will displace the printing bar 80 and hammers 99 thereon along the guide slots 79 toward engagement with the printing wheels 8. In this connection it is to be noted that any check "C" when inserted to printing position in the guide chute 61 will be positioned in a manner whereby the magnetic ink ribbon 127 is fed between said card and the type wheel 8. However, in lieu of displacing the type wheels against the printing ribbon in the usual manner said wheels now remain stationary while the printing hammers rather than engaging the printing ribbon are now adapted to engage the rear side surface of the check. Thus it is now possible to have the support means for the printing wheels 8 and suitable detent means, to be hereinafter described, therefor to be more solidly mounted on fixed supports, rather than the usual oscillating type support means. Also, by utilizing a solid mass type hammer for direct engagement with a check, rather than individual stroke hammers and against the printing ribbon, as in the heretofore known devices, applicant provides for a more solid impact but with less vibration of the parts. This, by reducing smudging, will provide for a more uniform and sharp printing action, so necessary to any subsequent magnetic ink sensing operations.

To further assure against smudging in a printing operation the following detent means for each of the printing wheels 8 are adapted for engaging said wheels just prior to a release of the printing bar 80 above described.

For each of the printing wheels 8 there is provided a detent pawl 115 (FIG. 3) loosely mounted upon a transverse shaft 116, supported within the left- and right-hand subframes 5, 6. Mounted each upon the left- and right-hand ends of shaft 116 are bell crank levers 117 (see also FIG. 4), having fast within a rearward arm thereof a transverse rod 118. Said rod extends transversely beneath a rearward arm of each of the detent pawls 115, so that in the counterclockwise position of said bell cranks 117 the detent pawls 115 are normally held against tension of their respective springs 119, free of engagement with suitable notches 120 formed along the edge of each corresponding order of the printing wheels 8. Bell cranks 117 are each provided with a roller 121 on an upwardly extending arm thereof, said roller being in engagement with the surface 122 of a pair of corresponding levers 123, loosely mounted for pivotal movement upon the support shaft 88 of the cam members 87 earlier described. Levers 123 are biased in a clockwise direction by suitable related springs 124 and are held in the position shown in FIGS. 3, 4 by means of a lateral lug 125 on said levers being normally in engagement with the above rollers 121 on the respective bell cranks 117.

During the operation of cam members 87 earlier described, however, a forward edge 126 of said cams will engage lugs 125 and impart a counterclockwise operation to levers 123, whereby the surface 122 thereof will be carried free of rollers 121 to release bell cranks 117 with rod 118 for clockwise operation. Upon release of rod 118 all of the detent pawls 115 under influence of their individual springs 119 are rocked into engagement with the notches 120 of the corresponding printing wheels 8, so that said wheels are held firmly in printing alignment during the subsequent operations of printing hammers 99. In this connection it is to be noted that the above release of roller 121 from surface 122 will slightly precede release of latch surface 96 from projection 95, in effecting a tripping of said printing hammers for impinging a check "C" against the paramagnetic ink surface of ribbon 127, said ribbon in turn being forced against the value set type wheels 8 whereby to effect corresponding value printing upon the face of said check, as in the manner heretofore described.

*Feed means for the magnetic ink ribbon*

It will be recalled that for the check printing operations above set forth all of the type hammers operate in unison and a full complement of denominational orders of type wheel 8 are effective for each printing operation, that is, zeroes are always printed relative to any columns having no significant amounts. Ordinarily for magnetic type ribbons the ink is exhausted therefrom during each printing operation. Thus special means are provided herein whereby for each operation the ribbon is advanced a considerable step of movement, in order that a clean ribbon will be presented to all orders of the type wheels.

Referring now to FIGS. 1, 14, 15, fast to the right side framing of the machine is a hub 128 having a disc 129 mounted upon a shoulder 130 thereof. A threaded end portion 131 of hub 128 extends through a suitable orifice in the side frame 1 and a nut 132 on threaded end 131 secures hub 128 and disc 129 tightly against frame 1, said hub 128 and disc 129 thus being held against any rotation. Equidistant on the circumference of hub 128 there is milled four flat portions 128' and through a diameter of hub 128 relative to a flat portion 128' is drilled a hole 133, while along the central axis of the hub is drilled a recess 134 and within the peripheral diameter of said hub 128 is cut an annular groove 135. Within the hole 133 are inserted a pair of ball members 136 and thereafter a suitable resilient retainer, such as a well-known rubber O ring 137, is inserted within the annular grove 135.

Magnetic ink ribbons are usually supplied in spool form wound upon a hollow core or sleeve 138 made of a semi-rigid material such as cardboard or plastic. Such a spool of ribbon is placed upon the hub member 128 and a cover 139 is next assembled over the ribbon. Cover 139 has fast therein a central pivot pin 140 having an enlarged diameter portion 141 and an enlarged tapered end portion 142, as shown in FIG. 14. When installing cover 139 pin 140 is inserted within the recess 134 and said tapered end 142 will act to thrust the ball members 136 outward against the O ring 137. Thus when cover plate 139 is fully mounted ball members 136 are held by said O ring within the recess between the enlarged portions 141, 142 of pin 140 for yieldably maintaining the said cover in mounted condition. At the same time it is to be noted that the O ring 137 is now expanded by the displaced ball members 136 so that the outer diameter of said ring is thrust into frictional engagement with the inner side of the ribbon core member 138, and thereby providing for slight frictional resistance to any feeding operations of the ribbon 127 therefrom.

From spool 138 ribbon 127 is fed over a guide roller 143 (FIGS. 1, 2) and thence to extend across the type members 9 and around suitable rollers 144, 145 on the left-hand side of the machine (FIG. 6), from where the ribbon now passes around a portion of a power feed pulley 146 and finally around a guide roller 147 to a storage spool 148, supported upon the left side framing 2 of the machine in the manner now to be described with particular reference to FIG. 11.

Fast within frame 2 is a stub shaft 149 having mounted for rotation thereon the reduced diameter portion 150' of a sleeve 150. Sleeve 150 is provided with a shouldered portion 151 upon which is mounted a disc 152 forming a backing plate for the ribbon take-up spool 148. Mounted upon reduced end portion 150' of sleeve 150 and adjacent disc 152 is a flanged hub 153 provided with a shoulder 154 upon which is loosely mounted the opposed halves of a split pulley wheel 155. A collar 156 is spun fast upon the end of sleeve 150' for securing hub 153 thereon, so that said collar sleeve 150, hub 153 and backing disc 152 are yieldably rotatable as a unit upon shaft 149. Motor driven belt 51, earlier described with reference to FIG. 6, engages pulley 155 and will force the pulley wheels into light frictional engagement with flanged hub 153 and collar 156, whereby during any motor operation pulley 155 tends to effect a continuous light slipping clutch drive action toward rotating the sleeve 150. Sleeve 150 includes an open end slot 157 within which is inserted a pair of bowed spring clips 158 (FIG. 12). The type ribbon 127 is first inserted into slot 157 and between clips 158 and thereafter the take-up spool 148 is inserted on the free end of sleeve 150. A suitable open end slot in the hub portion 148' of spool 148 permits the ribbon to extend therethrough and so be wound upon the outer circumference of said hub. At the same time the inner circumference of said hub engages the outer free edges of the spring clips 158 and depresses said clips into a suitable groove 159 in sleeve 150, thus providing frictional means for maintaining spool 148 upon the free end of sleeve 150.

To effect a feeding operation of ribbon 127 from the storage reel 138 (FIG. 1) to the take-up spool 148 (FIG. 6) the following means are provided.

It will be recalled that for each operation of the main clutch means 103–105 described with reference to FIG. 5 a rock shaft 301 is caused to be rotated counterclockwise and returned. With particular reference now to FIGS. 6, 10, and 13, shaft 301 extends leftwardly beyond the left side framing of the machine and has secured thereto, by means of pin 160, a bushing 161 having a reduced diameter shoulder portion 162. Also secured to shaft 301, by means of pin 163, is an upwardly extending arm 164 (FIG. 6). Adjacent arm 164 and being loosely mounted upon shaft 301 is a downwardly extending arm 165. Arms 164, 165 are each connected by respective links 166, 167 to the lower end of a lever 168 loosely supported upon the stub shaft 149. Thus it will be noted that upon a rocking operation of shaft 301 the arm 164 oscillates therewith and at the same time said arm, through the above link connections will act to operate arm 165 therewith but in an opposite direction to the operations of shaft 301. Loosely mounted upon shaft 301 and being spaced between the shouldered end 162 of bushing 161 and the hub 169 of arm 165 is a pulley wheel 170. Upon shoulder 162 and a leftward extending hub 171 of pulley wheel 170 is mounted a continuous coil friction spring 172, said spring being wound in manner so that as shaft 301 rotates in a forward or clockwise direction, as viewed in FIG. 6, said spring is caused to be contracted and will impart such movement of said shaft to the pulley wheel 170. Upon a rightwardly extending hub 173 of said pulley wheel is wound a coil friction spring 174 which continues also around the hub 169 of the arm 165. Spring 174 however is wound opposite to the spring 172, so that during the above-described clockwise operation of pulley wheel 170 and counterclockwise operation of arm 165 spring 174 will expand, thereby to release said pulley wheel and arm 165 for such operation. In a return or counterclockwise operation of arm 164 with shaft 301 said arm by means of links 166, 167 will act to impart a clockwise operation of arm 165 and in this instance spring 174 is caused by frictional engagement with hubs 169, 173 to contract and impart said clockwise movement to the pulley wheel 170. During such return operation of shaft 301 and hub 161 friction coil spring 172 is caused now to expand and so releases pulley wheel 170 for such additional clockwise operation.

Pulley wheel 170 has flexible drive connection, by means of a yieldable belt 175, with the pulley wheel 31 for the ribbon drive feed pulley 146, earlier described. From the above description therefore it will be noted that upon the start of a machine cycle of operation of the clutch means of FIG. 5, shaft 301 and ribbon feed pulley 146 start from zero speeds and will increase gradually to maximum speed at mid-forward stroke and thereafter at reducing speed to a zero speed point at the end of such forward stroke of a machine operation. Again, the same is true for the feed pulley 146 during return stroke of the parts.

As earlier stated it is imperative in order to obtain a clear print that the magnetic ink ribbon 127 be stationary at the time of engagement thereof with the printing members 9, previously described. Thus, the above arrangement of the feed devices is very advantageous in that the machine cyclic devices continue in an uninterrupted operation while the novel feed devices operable thereby provide for a zero speed at the time a printing is effected under control of said cyclic devices.

It will be recalled that upon manual adjustment of a control lever 20 (FIG. 6) to its "ON" setting for check printing, a pawl 27 is permitted a clockwise operation by its spring 32, whereby to release tooth 29 thereof from engagement with the knurled surface of hub 30 (FIG. 10) for the tape feed pulley 31. So that said pulley will be locked against rotation at the time that printing takes place a pin 176 on the pivoted arm 168 is adapted near the end of its forward stroke to engage a cam surface 177 of pawl 27 and so reengage tooth 29 of said pawl with the knurled hub 30 in time for locking the ribbon feed means while printing is being effected. As shown in FIGS. 6 and 7 a roller 178 on a suitable spring urged lever 179, pivoted at 180, serves to hold ribbon 127 in frictional engagement with the feed pulley 146. Also in this connection it will be noted that following printing operation of hammers 99 (FIG. 4) a steep cam edge 87' of the cam member 87 acts to immediately restore said hammers free of the amount check entered in position for printing thereon.

In order to disable operation of the check printer hammers during such times as it is desired to use the machine in lister/adding operations only, the following means are provided.

As shown in FIG. 1 there is secured to the plunger 76 of the solenoid 71, for releasing the machine cyclic clutch under control of any check being moved to printing position, a forwardly extending rod 181. The forward end of rod 181 is supported by a pivoted lever 182 and extends above a lug 183 of a rearwardly extending arm 184 fast to the shaft 84, to which also is secured the actuator levers 83 (FIG. 4) for the printing members 99. Thus, even though check printing control lever 20 is set for check printing operations, unless a check is inserted for energizing the solenoid 71, as hereinbefore described, rod 181 in its normal forward position will act to block operation of shaft 84 and actuator levers 83 and so prevent operation of the check printing devices during noncheck printing machine cycles of operation.

Connected in series circuit with the check operated switch 69 (FIG. 2) for solenoid 71 is a microswitch 185 (FIGS. 6, 17) including a control arm 186 engageable with the link member 36 displaceable by lever 20, as in manner earlier described. With lever 20 in the forward or "ON" position for check printing a surface 187 of link 36 will act to hold switch arm 186 in depressed position for maintaining said switch in a closed circuit condition. Upon adjustment of lever 20 to its "OFF" or noncheck printing position link 36 moving rearwardly will displace surface 187 free of arm 186, so that said arm is permitted to rise upwardly and said switch is now in open circuit condition and thereby will disable clutch control solenoid 71 against operations.

It is contemplated herein that check printing however is to be limited to add key 114 control operations only. Therefore, as earlier set forth, keys for the total, subtotal, subtract and nonadd operations each include an associated microswitch 113 all normally closed and in common series circuit with the machine clutch control solenoid 71. Thus, even though master switch 185 be closed by virtue of the lever 20 being in the "ON" control position, an operation of any of the above keys will open the contacts of its related switch 113 and so prevent energizing of the clutch control solenoid 7, so that no machine cyclic operation will be effected until such key is restored and the add key 114 is depressed.

While there have been shown and described and pointed out the fundamental novel features of the invention as applied to a preferred embodiment thereof it will be understood that various omissions and substitutions and changes in the form and details of the devices illustrated and in their operations may be made by those skilled in the art, without departing from the spirit as indicated by the scope of the claims appended hereto.

What I claim is:

1. In a business machine of the class described the combination comprising:
    a first printing means including printing type members displaceable to selective value positions in accordance with an amount entered within said machine;
    auxiliary printing means including printing type members settable to corresponding selected value positions with the said first printing means;
    power means including a clutch in common for effecting a printing operation relative to both the said printing means;
    a first control means normally operable to release said clutch in effecting for determining an operation of said power means;
    a secondary control means settable for disabling said clutch release and thus modifying the said first control means whereby to prevent said operation of said power means incident to an operation of said first control means;
    means thereafter operable for releasing said secondary control means whereby to cause an engagament of said clutch and thereby operation of said power means; and
    control means for effecting an operation of the latter said releasing means upon an insertion of a record form to printing position relative to the said auxiliary printing means.

2. In a business machine of the class described the combination comprising:
    a first printing means including printing type members displaceable to selective value positions in accordance with amounts entered within said machine;
    auxiliary printing means including printing type members settable to selected value positions in accordance with any setting of the first said printing means;
    power means including a clutch for effecting a printing operation relative to both the said printing means;
    a first control means normally adapted for releasing said clutch for operation of said power means;
    a secondary control for said clutch including means presettable for preventing a release of said clutch in the operation of said first control means;
    means operable for subsequently normalizing said preventing means and thereby permit upon any subsequent operation of said first control means an engagement of said clutch for operating the power means; and
    control means for said normalizing means adapted to effect said normalizing thereof upon movement of a record form into printing position relative to the said auxiliary printing means.

3. The invention according to claim 2
    said first control means including a lever operable under manual control to effect said release of said clutch;
    said presettable means including a latch settable for intercepting clutch engaging movement of said lever; and
    manually adjustable means for preseetting said latch to effective or ineffective condition.

4. In a motor driven business machine having means for entering selective amounts;
    differentially movable actuators;
    cyclic means for adjusting said actuators in accordance with selected amounts entered upon said entering means;
    a motor switch;
    a clutch between said cyclic means and said motor; and
    control devices adapted for effecting both a closure of said switch to cause an operation of the motor and concurrently therewith a release of said clutch, whereby to effect an operation of the said cyclic means for adjusting said actuators; in combination therewith:
    auxiliary printing devices settable to selective value positions by said adjustment of said actuators;
    secondary control means adapted for modifying said control of said motor switch and said clutch by the first said control means, whereby to effect a closure of said motor switch for causing motor operation only, while restraining the first said control devices from effecting operation of said clutch and so prevent said operation of the said cyclic means;
    operating means for said secondary control means adapted subsequently to effect a release of said clutch and thereby initiate an operation of the cyclic means;
    and control means therefor operable by insertion of a record form to printing position relative to said auxiliary printing devices to effect said operation of said secondary control means.

5. In a motor driven business machine having
    value insertion means;
    amount registers;
    printing type members;
    reciprocatory differentially movable actuators therefor;
    cyclic means including a rock shaft operable thereby for adjusting said actuators to selective value positions;
    a motor switch;
    a clutch between said cyclic means and said motor; and
    manually operable control devices adapted for effecting closure of said switch to cause motor operation and release of said clutch to effect operations of said cyclic means, the combination therewith of:
    auxiliary printing devices settable to selective value positions in accordance with operations of said actuators;
    secondary control means settable for modifying the control by said manually operable control devices whereby to prevent release of said clutch while closing said switch for causing motor operation;
    electromagnetic means for operating said secondary control means whereby to effect a subsequent release of said clutch for initiating operation of the cyclic devices;
    circuit means for said electromagnetic means including a switch; and control devices for closing the latter said switch upon insertion of a record form to printing position relative to said auxiliary printing devices.

6. The invention according to claim 5; wherein said manually operable control devices include a clutch control member releasable thereby for determining engagement of said clutch; and
said secondary control means include a latch member presettable for preventing said control member from releasing said clutch.

7. The invention according to claim 6; and including control means manually settable to alternative positions for adjusting said latch to enable or disable said secondary control means.

8. The invention according to claim 7; and including a second switch in series circuit with the first named switch for said electromagnetic means and adapted for operation by said manually settable control means to enable or disable the said circuit for said electromagnetic means in accordance with a corresponding adjustment of said latch.

9. The invention according to claim 5; including feed devices operable with operations of said motor whereby to advance an inserted record form to printing position and to effect thereby operation of said control devices to close the latter said switch for initiating an operation of the cyclic devices.

10. The invention according to claim 5;
said auxiliary printing devices including a fixed support; and
a plurality of ordinal printing members thereon each adjustable to bring selective type thereof to printing line position.

11. The invention according to claim 10; including individual printing hammers related each to a corresponding one of the said ordinal printing members and;
a unitary support member in common for all the said printing hamers, said support member displaceable for effecting simultaneous operations for all the said printing hammers as a single unit.

12. The invention according to claim 11; and buffer means between said unitary support member and said printing hammers including a strap of resilient material extending through the said hammers for operation therewith.

13. The invention according to claim 11; including a printing ink ribbon extending transversely of the printing members;
guide means for supporting a record form between said ink ribon and the printing hammers; and
wherein the printing hamers upon operation will force the record form against said ink ribbon and thus the ribbon against any selected type of the ordinal printing members at printing line position, thereby effecting printing on the reverse face of said record form to the printing hammers.

14. The invention according to claim 5; including a printing ribbon extending across the plurality of ordinal printing members comprising said auxiliary printing devices;
a unidirectional feed for advancing said ribbon;
means operable by said rock shaft in a forward stroke movement thereof for operating said ribbon feed in a stroke movement sufficient to traverse the printing ribbon substantially equivalent to the distance midpoint the said plurality of printing members; and
means operable by said rock shaft in a return stroke movement thereof for operating said unidirectional feed and again advance the printing ribbon whereby to complete a full traverse thereof relative to the said plurality of printing members.

15. The invention according to claim 14; including a first drive member fast upon said rock shaft;
a pulley wheel rotatable upon said rock shaft;
a friction clutch including a coil spring encircling adjacent hub portions of said first drive member and said pulley for transmitting rotation to said pulley wheel in a given direction during the forward stroke of a reciprocatory movement of said rock shaft;
a second drive member fast upon said rock shaft and comprising a radial crank arm;
a corresponding radial arm loosely mounted upon said rock shaft;
a pair of pivotally joined links extending one each across opposite sides of said rock shaft and pivotally connected one with said second drive member and one with said radial arm;
a friction clutch including a coil spring wound oppositely to the first said coil spring and encircling adjacent hub portions of said crank arm and said radial arm, being adapted upon a return stroke of said rock shaft to transmit a further rotation to said pulley wheel in said given direction.

16. The invention according to claim 15; including feed means for advancing an inserted record form to printing position in an operation of the electric motor incident to the modified control thereof;
said feed means including a drive belt;
a take-up reel for receiving the printing ribbon;
a fixed shaft having a flanged sleeve rotatable thereon for mounting said reel for rotation;
said sleeve including an extension thereof beyond said shaft with an open end slot therein for receiving the printing ribbon;
a flanged hub mounted upon said sleeve for rotation therewith;
a split pulley wheel mounted for rotation on the said hub between the said flanges and having engagement with the said drive belt for the record feed;
said drive belt expanding said pulley wheels for frictional engagement with the said flanges to provide yieldable drive connection to said sleeve;
mounted upon said sleeve an inner guide plate for the ribbon;
a removable guide plate including a ribbon support hub for slidable mounting upon the said extension of said sleeve; and
said extension including a slotted opening having inserted therein a pair of opposed spring clips adapted for seizing the ribbon.

17. The invention according to claim 16; and in which said spring clips exert frictional pressure upon the inner wall of said ribbon support hub, thereby maintaining the mounted hub and ribbon upon the said sleeve.

18. The invention according to claim 14; and a fixed trunnion for supporting a spool of said ribbon; said trunnion having
an annular groove within the circumference of the spool supporting surface thereof;
an orifice through a diameter of said trunnion coincident with said groove;
a longitudinal recess within said trunnion along its central axis and piercing beyond said orifice;
at least one ball shaped member inserted within said orifice;
a resilient retainer ring mounted in said groove completely within the outer peripheral diameter thereof;
a removable cover case including a stub shaft fast therein;
said shaft tapered at its free end and including a reduced diameter portion for cooperation with said ball member, whereby to displace said member for distorting said retainer ring beyond said groove and thereby effect a frictional drag upon the ribbon while also yieldably securing said cover case with said ribbon upon the said fixed trunnion.

19. The invention according to claim 14; and means for mounting a spool of printing ribbon upon the machine framing including;

a trunnion fast to said framing and having an annular groove around the circumference thereof, said circumference including a plurality of depressed portions, an orifice through a diameter of sid trunnion which includes an opposed pair of said depressed portions, a recess along the axis of said trunnion and piercing substantially beyond the latter said orifice;

a pair of ball shaped members inserted within the said orifice;

a retainer of resilient material mounted within said groove for securing said ball members within said orifice;

a removable casing including a stub shaft fast thereto, said shaft being tapered at its free end, a groove in said shaft engageable with said ball members for yieldably holding said casing in mounted position, and in which said stub shaft displaces said ball members outwardly for distorting said retainer beyond the peripheral diameter of said trunnion to effect thereby a frictional drag for any ribbon spool mounted thereon within said casing.

20. The invention according to claim 15, including
a pulley wheel integral with a ribbon advancing means; and
a drive belt connection between each of said pulley wheels.

21. The invention according to claim 20; including
a serrated hub on the pulley wheel integral with the ribbon advancing means;
drive means for said rock shaft whereby ribbon advancement is momentarily reduced to zero during the terminal forward stroke movement of said rock shaft;
a detent pawl cooperable with said serrated hub;
means operable by the ribbon advancing means for effecting engagement of said detent with said serrated hub substantially coincident with said zero condition of the ribbon; and
means operable by said rock shaft for releasing the auxiliary printing means for a printing operation during said engagement.

22. The invention according to claim 21 and wherein the means for operating said detent includes;
a pivoted arm supporting the distal end of said joined links for inducing a given path of movement; and
a cooperating cam on said detent pawl for engagement therewith to effect an operation of said detent pawl during said operation of the ribbon advancing means.

23. The invention according to claim 21; and
means following said printing operation for releasing the auxiliary printing means free of a record form prior to a subsequent release of said detent from said serrated hub.

24. In a motor driven business machine having registering means and printing type;
value entering means;
differentially adjustable actuators;
cyclic means for adjusting said actuators whereby to bring the printing type to active position in accordance with amounts entered upon said value entering means;
a normally open switch in circuit with the motor;
a clutch between said cyclic means and the motor; and
a control member operable for closing said switch and concurrently therewith releasing said clutch, whereby to start the motor and to effect operation of the cyclic means for adjusting the actuators; and
means operable for effecting an operation of said control member; in combination therewith:
auxiliary printing devices settable to selective value positions in accordance with the adjustment of said actuators;

secondary control means selectively settable for enabling and disabling the operation of said control member;
a second switch normally open and in series circuit with the motor, said switch being adapted to be closed in an operation of the means for effecting operation of said control member, whereby a motor operation may be effected with the secondary control means set at disable condition;
electromagnetic means operable to displace the said secondary control means from its disable set condition whereby to cause said control member to effect release of the motor clutch and thereby initiate a machine cycle of operation;
a normally open switch connected in series circuit with the normally open said second switch and the said electromagnetic means;
guide means for receiving a record form;
feed devices operable in said motor operation for advancing the record form along said guide means; and
means operable by the advancing record form to close the last claimed switch and effecting thereby operation of said electromagnetic means.

25. In a motor driven business machine having register and printing devices;
value entering means;
differentially adjustable actuators therefor;
cyclic means for adjusting the actuators to bring the printing type to active position relative to amounts entered upon the value entering means;
a normally open switch in circuit with the motor;
a clutch in train with the cyclic means and the motor; and
control means operable for closing said switch and concurrently therewith to release said clutch for starting the motor and effecting operation of said cyclic means, whereby to effect value adjustment of the actuators; and
a manual control key operable to effect operation of the first said control means; the combination therewith of:
auxiliary printing devices automatically adjusted by the said actuators to selective value setting in accordance with such adjustment thereof;
secondary control means selectively settable whereby to enable or to disable the first said control means;
a second switch in series circuit with the motor normally open and closable for starting the motor in an operation of said key;
electromagnetic means adapted for displacing the secondary control means from disable to enable condition whereby to cause the first said control means to release the motor clutch and effect a machine cycle of operation;
a normally open switch in series circuit with said second switch and said electromagnetic means;
guide means for receiving a record form;
feed devices adapted in said motor operation for advancing said record along said guide; and
means operable by the record form to close the latter said switch whereby to effect operation of said electromagnetic means.

26. The invention according to claim 25 and including
a master on/off switch in series circuit therewith; and
a manual control lever adapted for adjusting the secondary control means to its enable or disable condition, said control lever acting also to set said master switch to on or off condition respectively in accordance therewith.

27. The invention according to claim 26 and including a plurality of manual control keys independently operable to cause an operation of the first said control means;

for each of said keys a normally closed switch, said switches all being in common series circuit with the said normally open switch related to the first said manual control key and the said normally open switch for said electromagnetic means; and wherein operation of any of said normally closed switches upon operation of a corresponding key will act to disable the circuit for the said electromagnetic means.

References Cited by the Examiner

UNITED STATES PATENTS

| | | | |
|---|---|---|---|
| 2,427,418 | 9/47 | Rast | 101—90 |
| 2,539,949 | 1/51 | Ericsson | 235—3 |
| 2,743,671 | 5/56 | Weber et al. | 101—235 |
| 3,083,641 | 4/63 | Childs et al. | 101—269 |

WILLIAM B. PENN, *Primary Examiner.*

UNITED STATES PATENT OFFICE
CERTIFICATE OF CORRECTION

Patent No. 3,202,091                                               August 24, 1965

James W. Dodsworth

It is hereby certified that error appears in the above numbered patent requiring correction and that the said Letters Patent should read as corrected below.

Column 1, line 19, for "positing" read -- posting --; same column 1, line 59 and column 2, line 2, for "added", each occurrence, read -- adder --; column 5, line 27, after "lead" insert -- 192 --; column 8, line 51, for "grove" read -- groove --; column 11, line 22, for "7" read -- 71 --; line 46, strike out "for determining"; column 12, line 17, for "preseetting" read -- presetting --; column 13, lines 39 and 52, for "hamers", each occurrence, read -- hammers --; column 15, line 4, for "sid" read -- said --; line 23, for "a" read -- the --.

Signed and sealed this 29th day of October 1968.

(SEAL)
Attest:

Edward M. Fletcher, Jr.                                    EDWARD J. BRENNER

Attesting Officer                                                          Commissioner of Patents